C. L. ALEXANDER, B. L. OSBORN, & J. G. ANTHONY.
Thill-Coupling.

No. 199,951. Patented Feb. 5, 1878.

Witnesses
Fred G. Dieterich
Augustus Watson.

Inventors
Chas. L. Alexander,
Beresford L. Osborn
by John G. Anthony
Daniel Breed
atty

UNITED STATES PATENT OFFICE.

CHARLES L. ALEXANDER, BERESFORD L. OSBORN, AND JOHN G. ANTHONY, OF WASHINGTON, DISTRICT OF COLUMBIA.

IMPROVEMENT IN THILL-COUPLINGS.

Specification forming part of Letters Patent No. 199,951, dated February 5, 1878; application filed September 21, 1877.

*To all whom it may concern:*

Be it known that we, CHAS. LOUIS ALEXANDER, BERESFORD L. OSBORN, and JOHN G. ANTHONY, of Washington, in the county of Washington and District of Columbia, have invented certain new and useful Improvements in Thill-Couplings; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Our invention or improvement in thill-couplings consists in a bolt provided with a springing arm, in combination with a clip having a catch on the crown thereof.

Figure 1:
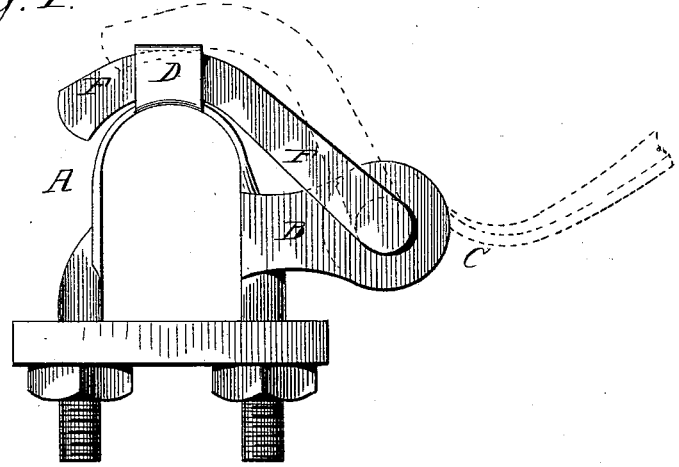
Figure 2:
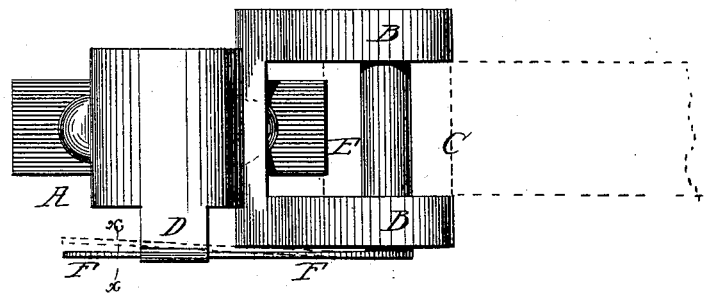
Figure 3:
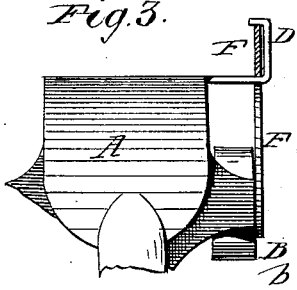

In the accompanying drawings, Figure 1 represents a side view of a buggy-clip having our improved shaft-coupling. Fig. 2 is a top view of the same, and Fig. 3 is a rear view.

In our improved thill-coupling the clip A is made with the usual lugs B, to receive the knuckle C of the shaft. On the crown of the clip is made a catch, D, as seen in Figs. 1, 2, and 3. The bolt E is made with a springing arm, F, which, like a latch, locks under the top of the catch D.

This improvement obviates certain difficulties found in using the bolt and hasp thereon, already patented by Alexander and Osborn, two of the parties to the present invention.

With this improvement, if there is any strain upon the bolt to throw the arm F around to the right or the left, or if the bolt fails to be driven quite home, the springing of the arm will enable it to lock in place under the catch.

This construction affords the very important advantage that the catch is not liable to be filled with mud or dirt, which might be frozen in place, and thus prevent the parts from working, as is sometimes the case with other springs or fastenings; and it may be remarked that our elastic arm F is a part of the bolt itself, and not a spring in the common acceptation of the term; and this arm may be made of steel in the same piece with the bolt, and then slightly tempered, so as to be sprung laterally in passing the point or projection on the top of the catch D, as seen in Fig. 3, where it will remain immovable until purposely sprung open.

Having described our invention, we claim as an improvement in thill-couplings—

The bolt E, having the springing crank-arm F, in combination with the catch D upon the clip A, substantially as described.

In testimony that we claim the foregoing as our own we affix our signatures in presence of two witnesses.

CHAS. LOUIS ALEXANDER.
  BERESFORD L. OSBORN.
  JOHN G. ANTHONY.

Witnesses:
 DANIEL BREED,
 FRED G. DIETERICH.